(12) United States Patent
Malcolm (10) Patent No.: US 7,706,772 B2
(45) Date of Patent: Apr. 27, 2010

(54) POWER SAVING SYSTEM AND METHOD FOR MOBILE WIRELESS NETWORK DEVICE USING HISTORICAL PERIODS OF SIGNAL INTERMITTENCE AND RELIABILITY

(75) Inventor: Jerry Walter Malcolm, Austin, TX (US)

(73) Assignee: Lenovo Singapore Pte. Ltd, Singapore (SG)

( * ) Notice: Subject to any disclaimer, the term of this patent is extended or adjusted under 35 U.S.C. 154(b) by 358 days.

(21) Appl. No.: 10/422,661

(22) Filed: Apr. 24, 2003

(65) Prior Publication Data

US 2004/0214616 A1   Oct. 28, 2004

(51) Int. Cl.
*H04W 52/28* (2009.01)
*H04W 60/00* (2009.01)

(52) U.S. Cl. .................. 455/343.4; 455/574; 455/435.1

(58) Field of Classification Search ................. 455/574, 455/567, 456.4
See application file for complete search history.

(56) References Cited

U.S. PATENT DOCUMENTS

| | | | |
|---|---|---|---|
| 4,523,332 A | 6/1985 | Mori | 455/343 |
| 4,736,461 A | 4/1988 | Kawasaki et al. | 455/343 |
| 4,903,319 A | 2/1990 | Kasa et al. | 455/574 |
| 5,140,698 A | 8/1992 | Toko | 455/76 |
| 5,179,724 A | 1/1993 | Lindoff | 455/76 |
| 5,590,396 A | 12/1996 | Henry | 455/426 |
| 5,799,256 A * | 8/1998 | Pombo et al. | 455/574 |
| 5,953,677 A | 9/1999 | Sato | 455/574 |
| 6,078,826 A * | 6/2000 | Croft et al. | 455/574 |
| 6,236,674 B1 | 5/2001 | Morelli et al. | 375/219 |
| 6,625,455 B1 * | 9/2003 | Ariga | 455/456.1 |

FOREIGN PATENT DOCUMENTS

JP       11041168       2/1999

OTHER PUBLICATIONS

"Adaptive Power Management Increases Cell Phone Talk Time" by Peter Lentini and John DeFalco of Ratheon RF Components, downloaded from http://www.amwireless.com/archives/2002/v14n10/v14n10D.pdf on Mar. 18, 2003, 17 pages.
"How Cell Phones Work: From Cell to Cell" by Marshall Brain and Jeff Tyson, downloaded from http://electronics.howstuffworks.com/cell-phone2.htm on Mar. 18, 2003, 3 pages.
"How Cell Phones Work: Inside a Cell Phone" by Marshall Brain and Jeff Tyson, downloaded from http://electronics.howstuffworks.com/cell-phone2.htm on Mar. 18, 2003, 3 pages.

* cited by examiner

*Primary Examiner*—Philip J Sobutka
(74) *Attorney, Agent, or Firm*—Robert H Frantz; Carlos Munoz-Bustamante (57) ABSTRACT

A system and method for managing battery energy usage by a mobile wireless network which detects threshold conditions for network signal found and lost; records historical events of signal found and lost with operational criteria associated with operational conditions of the events such as time, day, date, tower number, and geographic location; upon each detection of network signal loss, determines from the recorded event records a nap termination condition upon which network signal has been historically reliable; and enters a battery-saving nap mode until the nap termination condition is met.

13 Claims, 10 Drawing Sheets

*Prior Art*

Figure 4

*Prior Art*

POWER SAVING SYSTEM AND METHOD FOR MOBILE WIRELESS NETWORK DEVICE USING HISTORICAL PERIODS OF SIGNAL INTERMITTENCE AND RELIABILITY

FEDERALLY SPONSORED RESEARCH AND DEVELOPMENT STATEMENT

This invention was not developed in conjunction with any Federally sponsored contract.

CROSS-REFERENCE TO RELATED APPLICATIONS

Claiming Benefit Under 35 U.S.C. 120

Not applicable.

MICROFICHE APPENDIX

Not applicable.

INCORPORATION BY REFERENCE

Not applicable.

BACKGROUND OF THE INVENTION

1. Field of the Invention

This invention relates to technologies for controlling power consumption in portable or battery-powered devices which perform a function of wireless networking or communications, including but not limited to battery consumption optimization for handheld computers with wireless network interfaces, cordless telephones, cellular telephones, and specialized portable terminal devices (e.g. handheld bar coding equipment, portable point-of-sale devices, etc.)

2. Background of the Invention

Battery-powered, portable devices which perform wireless networking for voice and/or data communications as all or part of their functionality are well known in the art, including but not limited to:

(a) cellular telephones;
(b) wireless web browsers;
(c) cordless telephones and cordless small office/home office (SOHO) telephone switch systems;
(d) laptop computers, palm top computers and personal digital assistants (PDA) equipped with wireless local area network (LAN) or cellular data interface cards;
(e) handheld system terminals such as the units used by car rental companies to check in cars upon their return;
(f) handheld bar code and inventory terminals such as those used by retail and warehousing enterprises;
(g) wireless point-of-sale (POS) terminals such as price scanners and cash registers; and
(h) one-way, two-way, text and voice pagers and terminal devices.

All of these devices have several architectural aspects in common. First, they are primarily battery powered between periods of recharging. Recharging of the battery may occur when the device is placed in a cradle, attached to the docking station, or plugged into the battery charger device. They each must manage battery consumption efficiently, as battery life is a key factor for selection of a device in a highly competitive industry. For larger systems such as laptop computers, this may include shutting down disk drives under certain conditions. For most systems, this also includes turning off display backlights, shutting dawn or suspending non-critical software and hardware functions, to completing powering down the entire unit.

It is common within the industry to refer to these various methods of battery consumption as "standby", "sleep", "suspension", "battery saver", or "low power" mode. Although almost all battery-powered devices such as these advertise and claim "advanced" battery saving functions, most implement different schemes of power consumption management depending on their specific control firmware and the hardware capabilities of the system to shut down or sleep portions of the system. So, even though two comparable personal communications systems (PCS) telephones use the same battery type, such as a Lithium Ion battery, and have the same wireless range, their operational characteristics may be considerably different based upon their ability to disable or control power consumption.

For the remainder of this description, we will refer primarily to cellular telephone examples and implementations. Certain terms from cellular telephone parlance are analogous in functionality to terms from other networking technologies, such as PCS towers being similar to "base stations" or wireless access points. It will be readily recognized by those skilled in the art, however, that the problems and the invention presented herein are common to all the various wireless network battery-powered devices as previously exemplified.

Figure 1:
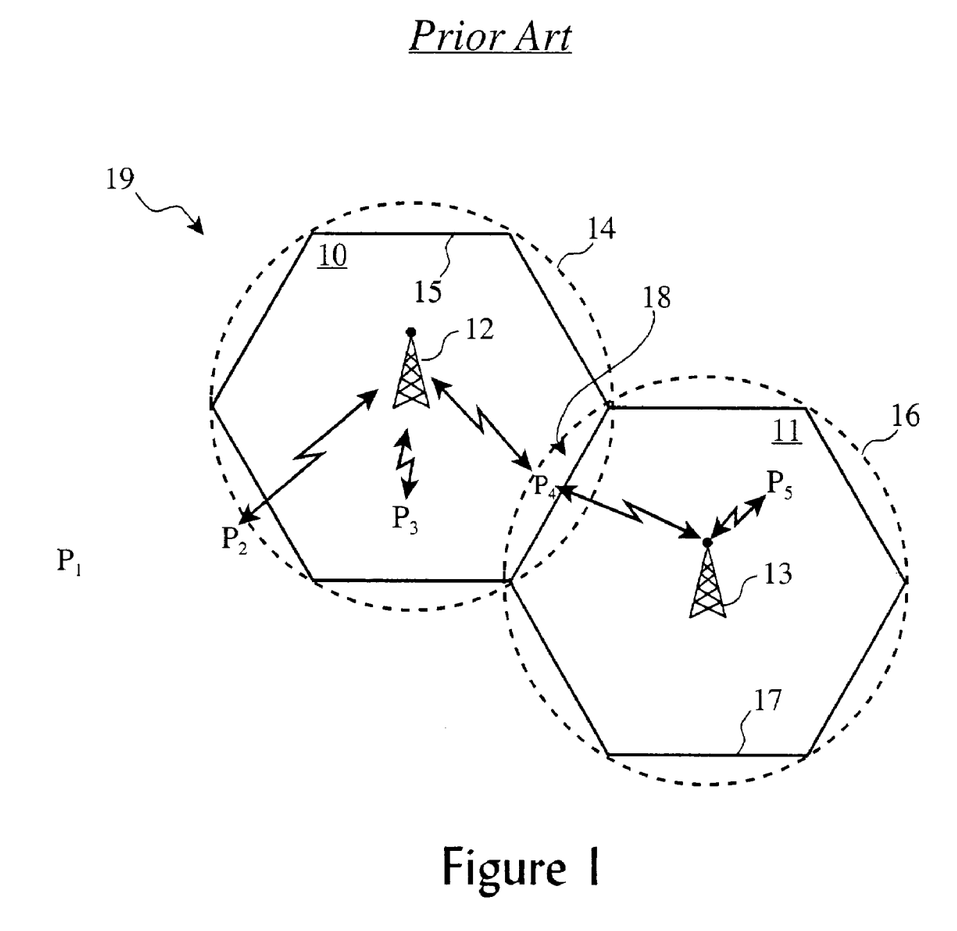
FIG. 1 shows a typical arrangement of two adjacent cells in a cellular network.

Turning to FIG. 1, two "cells" (10, 11) are shown geographically adjacent to each other, each cell having a "tower" (12, 13) located in its center. In this example, the cells are considered to be of hexagonal shape (15, 17) for network planning and management purposes, but in reality, the signals from the towers propagate equally well for a generally circular area (14, 16) of coverage, barring any geophysical obstruction such as a mountain, bluff, or tall building. The hexagonal cells fit wholly within the circular regions around each tower, thereby producing areas of coverage overlap (18) between adjacent cells. In practice, a cellular system (19) comprises multiple cells in a honeycomb arrangement, but only two adjacent cells are shown here for ease of understanding.

When a terminal device such as PCS handset or wireless web browser is at a position $P_1$ outside of reception range of a tower within the system, the device will be unable to perform its functions such as making or receiving telephone calls, performing data communications, etc. Most systems will continuously "search" for a tower signal, performing some type of protocol to make contact with one or more towers which may be within reception range. This process of searching may simply include measuring a signal strength on a frequency and/or channel from the tower, or may be more active such as sending or transmitting a signal from the device's transmitter to initiate a contact with an in-range tower. While the former approach will consume some power for the search, the latter almost always consumes even more power as transmission of signals is usually a more power intensive operation than simply receiving a signal.

As a device reaches or travels a position to the "fringe" area of coverage for a tower $P_2$, it may detect a usable signal strength from the tower (12) within its reception range, and/or may be able to effectively transmit a code, registration or other signal to the tower (12). At this position, the device is technically within the tower's cell (10).

The "logging in" or "registration" process as a device enters a tower's cell varies between different wireless technologies. For example, the registration process employed by PCS systems is different than the registration process used by its predecessor "analog" (e.g. AMPS") cellular system, and both are very different than the registration process employed by wireless data networking technologies such as BlueTooth, IEEE 802.11b, Motorola's Ricochet network, two-way pager networks, etc. For illustrative purposes, however, we now present a brief overview of the PCS registration process.

When a PCS telephone is first turned ON, it begins to "listen" for or search for a System Identification (SID) code which is continuously transmitted by PCS towers on a predetermined "control channel" frequency. Each PCS system operator (e.g. Sprint, MCI, AT&T, Verizon, VoiceStream, etc.) has been assigned a unique SID value, such that a PCS phone can determine if it is within a network compatible with and authorized for its use. Until a compatible SID code is received, the PCS handset will display a "No Service" indicator or "Out of Range" indicator.

Once the handset has received a compatible SID, it transmits a registration request with the SID on the control channel, which is received by one or more towers within range. For example, in FIG. 1, if the handset is in position $P_2$, only one tower (12) may receive the registration request. If the handset is in position $P_4$, however, when it is powered ON initially, it may be within the overlap of multiple cells, and the registration request may be received by multiple towers (12, 13), or may be directed to the tower for which the strongest signal strength is detected.

Many wireless networked systems are designed to handle providing continuous service as a unit travels from one cell to another, while other technologies do not provide this functionality. For example, a PCS telephone is expected to be used in a moving vehicle or while walking, and as such, the PCS system specifications and design include protocols and schemes for "hand off" of service to a handset from one cell tower to another. So, for example, as a handset moves from position $P_3$ to position $P_4$, and then to position $P_5$, the handset may initially be served by first tower (12) and then be handed off to another tower (13) according to signal strength criteria and channel availability in each area of coverage (14, 16).

Figure 2:
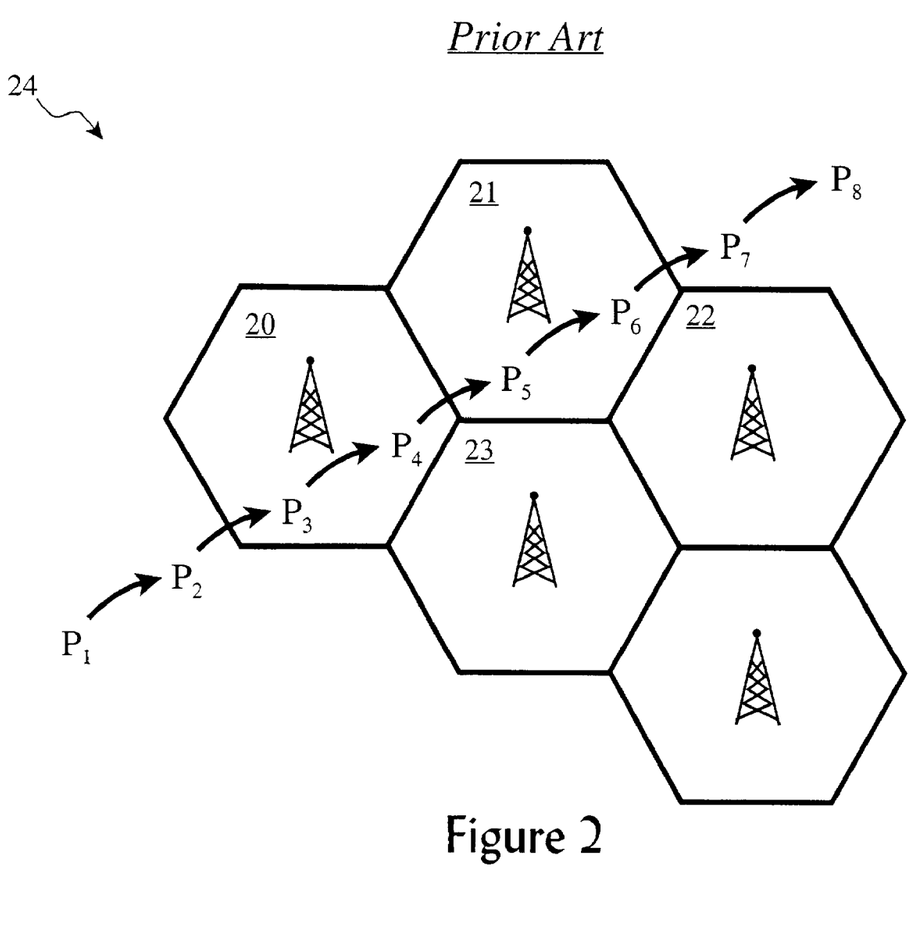
FIG. 2 illustrates movement of a wireless network device through a set of cells in a network system.

Turning to FIG. 2, a larger portion of a cellular network (24) is illustrated, to show how a terminal or handset may traverse multiple positions $P_1$, $P_2$, $P_3$, $P_4$, $P_5$, $P_6$, $P_7$, and $P_8$, starting outside a network, entering the fringe of the network, passing through and being served by multiple cells (20, 21), and finally passing through the fringe and out of the network. Certain cells (23, 22) may never provide service to the handset based upon its position and proximity to other, closer towers.

Figure 3:
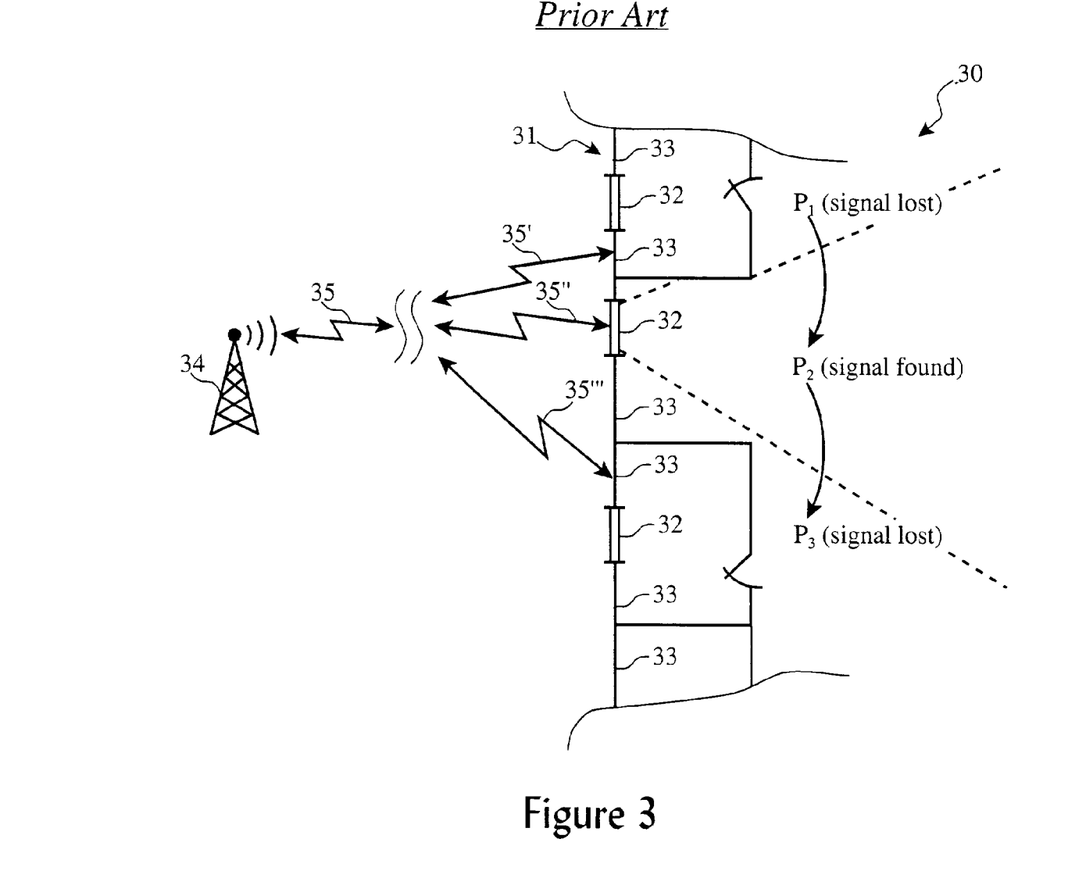
FIG. 3 provides a depiction of signal attenuation and interference caused by building structures.

If a handset, however, moves around the "fringe" area of a network or near the extremes of range for tower or base station, such as moving back and forth between positions $P_1$ and P2 or positions P7 and P8, the handset may repeatedly lose service, reregister, etc. This problem may arise when a handset is located clearly within the geographic region of a cell, cut in an area where reception is attenuated by geographical features of man-made structures such as buildings. For example, as shown in FIG. 3, assume a handset is located within the normal cell range of a tower (34) inside a building (31), the building having several outside wall portions (33) which highly attenuate (35', 35') the signal (35) from the tower (34). Additionally, the building may have doors and/or windows (32) which do not cause considerable attenuation (35")" of the signal (35) from tower (34).

Within the building, false "fringe" areas may be created, shown by the dotted lines, due to the inconsistent signal attenuation of building parts such that as a handset moves from position $P_1$ to position $P_2$ and then to position $P_3$, the signal may be lost and found intermittently. This may cause the handset to have to reregister repeatedly as in the case of moving in and out of geographic service areas, although the cause of the problem is due to signal obstruction rather than geographic range.

A similar problem may also arise as environmental conditions change, such as weather and/or electromagnetic interference (e.g. sun spot activity), causing a signal to "fade in and out".

Some technologies, however, assume that the terminals are relatively stationary, such as the PCS-derivative wireless local loop (WLL), and some wireless data networking technologies such as "WiFi". These systems do not include the hardware and software functionalities to perform the "hand off" from one tower, base station or access point, on the assumption that the terminals will remain within range of a selected tower for the duration of the operation of the unit.

To save battery consumption, many methods and systems have been devised implemented in part in hardware or "silicon" solutions, and in part in software and firmware. Or example, most terminals will turn off high-consumption functions such as display and keyboard backlights after a period of inactivity, regardless of network signal strength. Still more power is saved when the system has been out of range of a tower or base station for a given period of time. The terminal or handset will go into "sleep" mode for a predetermined amount of time in which it powers down nonessential portions of the handset, wake up when the sleep period has transpired, and begin the process again. Most of the timer schemes found in current handsets and terminals are relatively simple, although some more advanced approaches are available.

Figure 6:
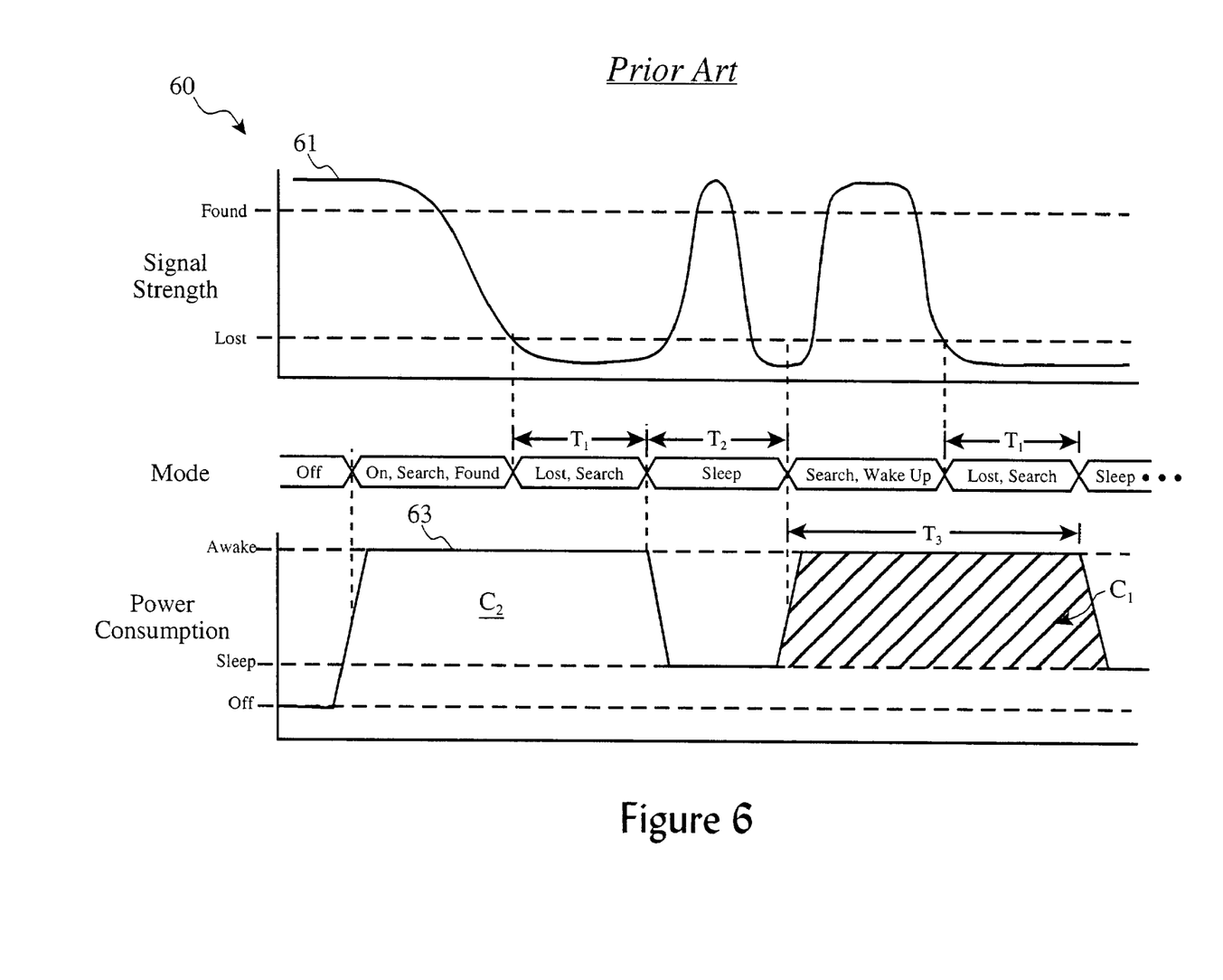
FIG. 6 graphically depicts the battery power consumption profile of typical schemes such as that shown in FIG. 5.

Turning to FIG. 6, an illustration (60) of such a common battery saving scheme is given. As the signal strength (61) varies, the mode (62) of the terminal will vary as will the power consumption (63). In this example, when the terminal is initially switched from OFF to ON, it enters a period of searching for a tower (or base station). Because the signal strength is initially strong, service is initiated ("found"), and battery consumption is normal ($C_2$). Later, however, as the signal strength fades, the terminal enters a period $T_1$. During which it searches for another tower for service. After the tower is not found for this amount of time, it will enter a lower power "sleep" state for a predetermined period $T_2$. During this sleep period, the signal strength may temporary improve, and fade again.

When the sleep time $T_2$ expires, the terminal "wakes up", returning to a normal battery consumption level, white it searches and reregisters with the closest available tower, assuming signal strength is good as shown in this example. However, if the signal strength fades again soon, as is common intermittent conditions (e.g. inside buildings, transient weather, etc.), the terminal again will spend period $T_1$ searching for a usable tower signal before it returns to sleep. This causes a waster of battery energy ($C_1$). For many wireless terminals and devices, battery consumption during the "search for signal" mode is much higher than idle mode while a signal is available. For example, in an office where "false positives" or intermittent signal acquisitions are made all day, a user's phone is basically in search mode all day long. In such a situation, the phone battery is often dead by the end of the day, in contrast to a day of use outside the office in range of a normal signal during which the battery may last two days or more on a signal charge.

Figure 5:
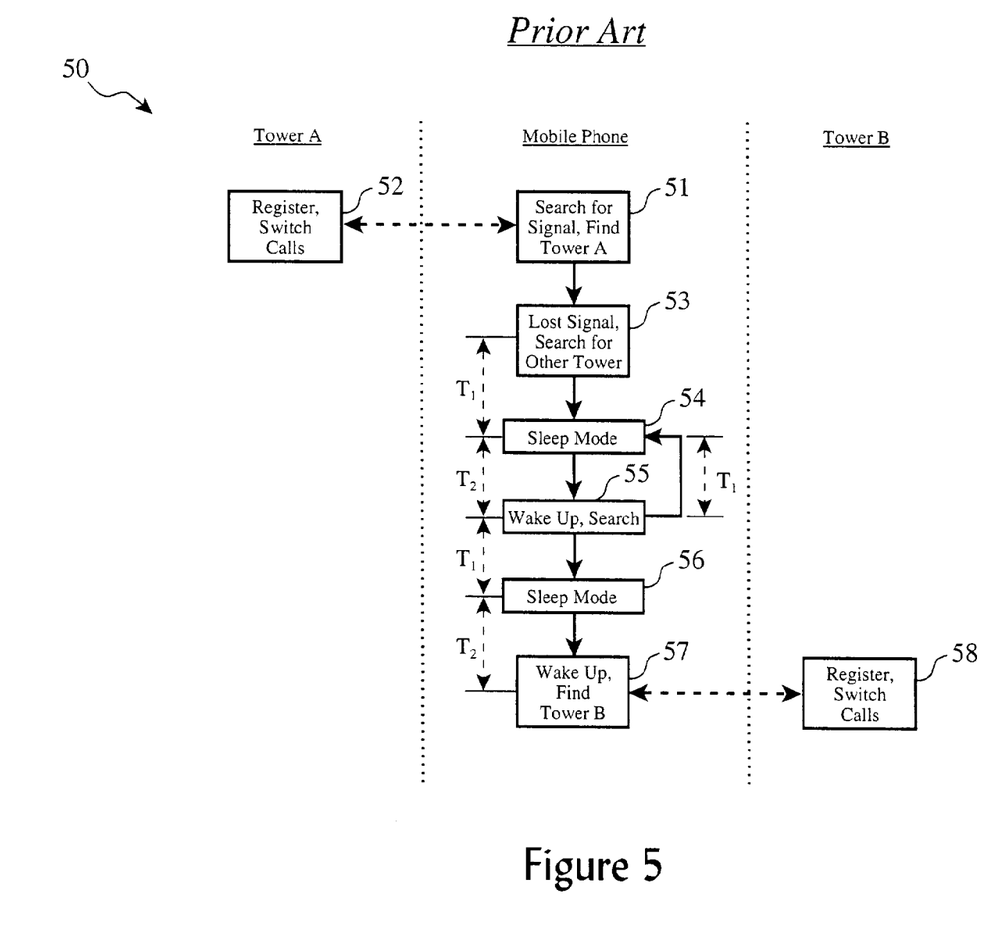
FIG. 5 illustrates the logical process of many common battery conservation techniques.

FIG. 5 provides a logical process (50) depiction for this type of battery saving method, including registering (52) initially with a first tower after searching (51) and finding the first tower's signal, losing (53) the signal from the first tower, searching (53) for a valid signal for a predetermined period $T_1$, and then iteratively sleeping (54) for a predetermined period $T_2$ and waking to search (55) until a valid signal is found (57) and the unit can register (58) with the same or an alternate tower.

Intermittent signal conditions such as there, unfortunately, are very common when a handset is present in conditions such as previously described. Additionally, as the handset is automated for these types of operations, many users may be completely unaware that their handset is performing transitory operations, especially if the handset provides no indication (e.g. a beep or tone) that signal is being found, lost found, lost, etc. So many users of such wireless devices experience much shorter battery life than advertised, but are unaware of the cause or potential remedies for the situation.

Manual remedies may include turning OFF the device when entering an area of known conditions such as this. This, however, is counterintuitive to using the device continuously, and depends in a great part on the knowledge and foresight of the user about such geographic and environmental conditions. For example, a user would have to:

(a) know that his office is near the fringe of signal strength;
(b) notice that a strong storm is arriving in the area;
(c) have the presence of mind to turn OFF the device at the storm's outset; and
(d) have the presence of mind to turn it back ON again when the storm has passed.

This process would likely lead to not turning the handset back ON, missed calls, etc. Alternatively, the user could take the PCS handset OFF his belt clip or out of her purse when in a building known to cause these problems, place the unit near a window during their visit to the building, and retrieve the unit before leaving. This would likely lead to missed calls (e.g. user is in another room when the phone rings), and lost handsets (e.g. user forgets to take his or her phone with them when they leave).

Therefore, there is a need in the art for a system and method which intelligently minimizes the battery consumption of portable or mobile wireless devices. Preferably, this new system and method would achieve such battery savings and life extension without expensive or complex additional circuitry or technology than is typically present in such wireless devices.

BRIEF DESCRIPTION OF THE DRAWINGS

The following detailed description when taken in conjunction with the figures presented herein provide a complete disclosure of the invention.

SUMMARY OF THE INVENTION

According to the present invention, a wireless network device such as a cellular telephone is made aware that the previously described marginal signal level situation exists, i.e. that the phone is in a building where reliable service really isn't available, but it may periodically temporarily find a tower signal.

Unnecessary battery consumption is avoided through several means provided by the invention. In one aspect, a low power "nap" radio signal is provided at the doorways of a building. When the phone receives the "nap" signal, it knows that it is passing though the door, it knows that if it loses a signal, to go to a special sleep mode referred to as a "nap". Leaving the building will immediately wake it up, as the signal near the doorway is received again. Optionally, the phone may "wake up" periodically during the nap for a quick check just to be sure it didn't miss the exit signal. An objective of the present invention is to have the phone realize that it is in a location where, even if it picks up a random signal periodically, it is not going to get a reliable signal long term, and that therefore it should cease attempting to try to communicate, thereby saving battery power.

In another aspect of the invention, the phone is enhanced to memorize patterns of signal loss and difficulty, such as conditions that for several previous days from 8:00 a.m. to 12:00 p.m. and from 1:00 p.m. to 5:00 p.m. it was unsuccessful in reliably connecting to a tower. During future operation, if signal finding trouble is encountered during the same periods, an automatic nap period can be entered until the expected difficulty is over according to the memorized pattern. For example, if it is 8:05 a.m. now, and the phone is again having trouble connecting to a tower, a nap may be entered until 12:00 p.m.

In another aspect of the invention, the phone can also memorize that it has a particular problem when connecting to a certain tower, which could likely imply that the user goes inside a building often that is close to that tower. This could be used in conjunction with the second aspect to refine the criteria for the variable nap period.

In yet another aspect of the invention, newer phones that are equipped with Enhanced 911 (E911) or Global Positioning System (GPS) to determine their actual location can memorize geographic locations where intermittent tower connections are experienced, and can nap until the position changes or for a variable length of time.

In still another aspect of the present invention, a phone may be preprogrammed, perhaps via the web or Internet, by the user using maps to identify GPS or E991 coordinates of buildings or street addresses where the phone should nap while inside or near.

DESCRIPTION OF THE INVENTION

The present invention is preferrably realized as additions to or modifications of existing wireless network device hardware, circuitry, software, or firmware, in part, total or combination. Wireless devices such as cellular telephones, wireless web browsers, cordless telephones, cordless small office/home office (SOHO) telephone switch systems, laptop computers, palm top computers, personal digital assistants (PDA), handheld system terminals and inventory devices, wireless point-of-sale (POS) terminals, and pagers (e.g. one-way, two-way, text and voice) are among the candidate hardware platforms for implementing the present invention.

Figure 4:
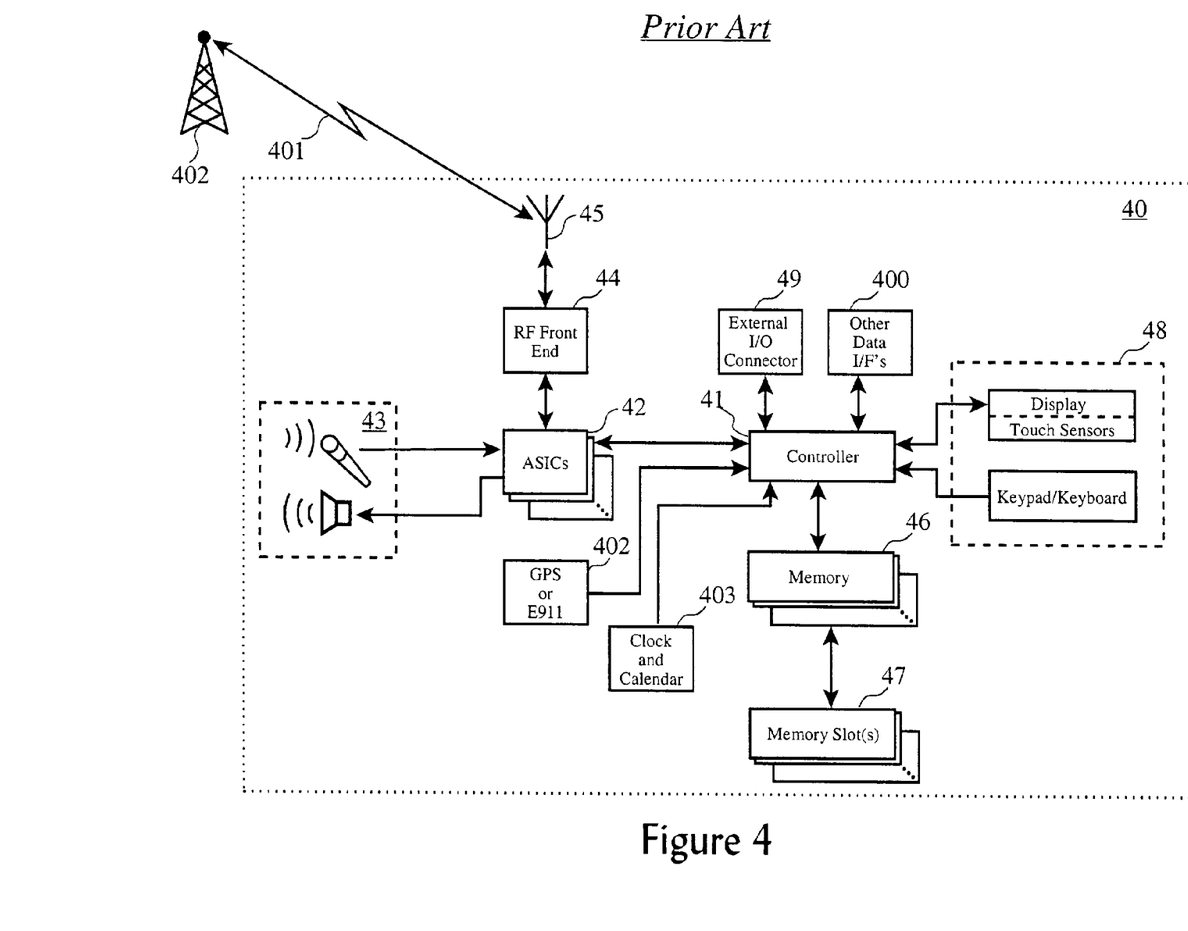
FIG. 4 sets forth a generalized architecture of a broad range of devices which use or employ wireless communications (voice, data, or both).

Turning to FIG. 4, a generalized architecture (40) of these types of hardware platforms is depicted. Although each actual device available on the market may vary in detail from this depiction, the general functionality and capabilities of each platform fit within the general view of this figure. Each system typically includes all or some of the following functions:

(41) a microprocessor, microcontroller, or control logic for implementing the logical processes of the unit;

(42) one or more application specific integrated circuits (ASIC) for voice compression, decompression, protocols, error checking/correction, security, encryption/decryption, and radio signal modulation/demodulation;

(43) a audio microphone and speaker or earphone for audible interfacing with the user;

(44) a radio frequency (RF) frontend including intermediate frequency stages, and an antenna (45) for receiving and transmitting RF signals (401) from and to a tower, base station, or wireless access point (402);

(46) one or more memory devices and types including some or all of Random Access Memory, FLASH Read Only Memory, battery-backed memory, and Read Only Memory, with one or more memory expansion slots (47) in some cases;

(48) a display such as an liquid crystal display (LCD), color TFT, or cathode ray tube (CRT) display, often coupled with a touch screen sensor for receiving user input and selections, typically provided with a keypad or keyboard or other special buttons for receiving user input and selections;

(49) often several external I/O connectors for battery chargers, external speakers and microphones, expansion keyboards and displays;

(400) often additional data interfaces such as IrDA or PCMCIA slots for receiving add-on hardware, interfaces, program packs, or software; and (403) a clock, timer and/or calendar for keeping time in units such as seconds, minutes, hours, days, months and years.

More advanced wireless network devices may include a location technology in detail such as a GPS receiver or E911 capability.

Figure 7:
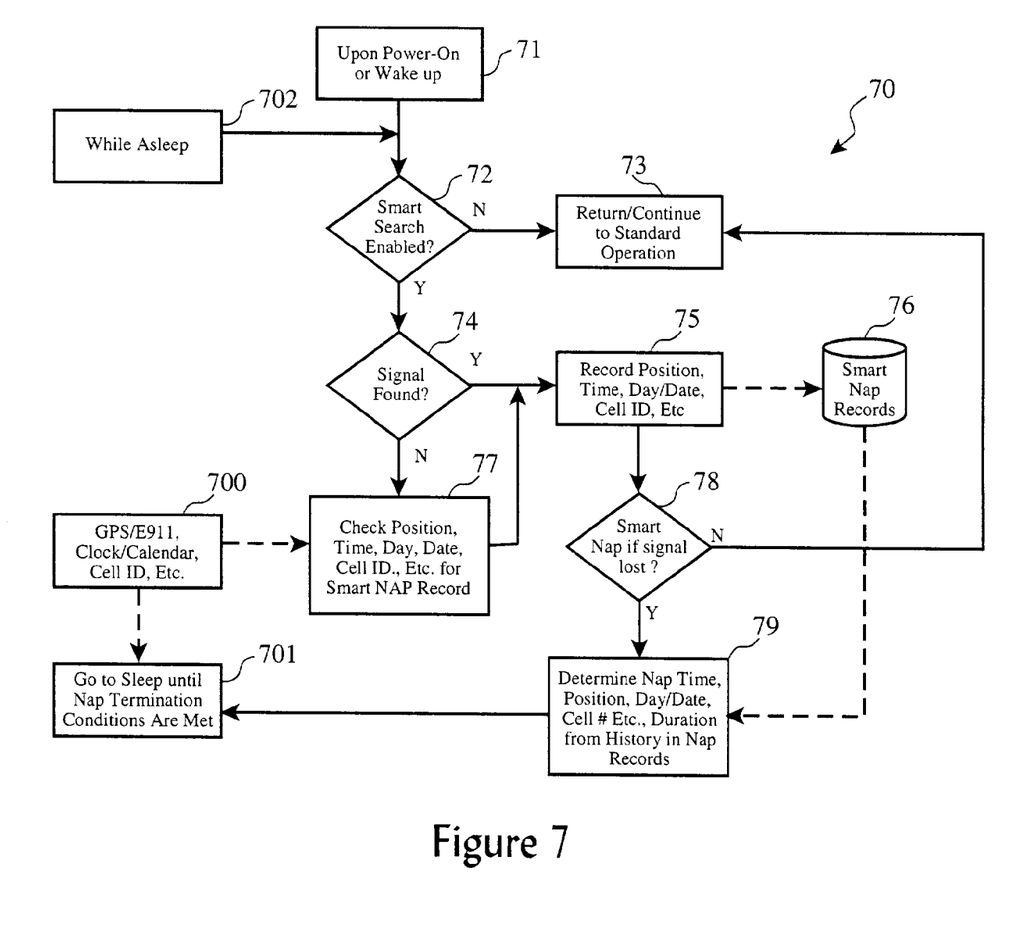
FIG. 7 sets forth the logical process of the present invention.

The present invention, then, is preferably realized as firmware or software stored in a wireless network device's memory (46) and executable by the device's controller (41). It may be preprogrammed into the device, or it may be downloaded from a memory card, the wireless network or another data network or interface, as the capabilities of the device allow and within the business model of the service provider. Once available in memory for execution, the device may follow the method (70) or logical process of our invention, which is illustrated in FIG. 7.

According to this method, when a device is initialized (71) such as turning it ON and/or waking it from a sleep state (702), a logical condition such as a user preference or control is checked (72) to determine if smart signal searching or smart napping is enabled. If it is not, then normal operation (73) of the device may proceed. Otherwise, if smart searching or smart napping is enabled, the device will search (74) for a time for a signal.

If a valid signal is not found (74), then certain parameters (700) to the condition are checked (77) and recorded (75) such as the time, day of the week, date, cell number/tower number, GPS/E911 location, etc., are recorded as a set of conditions under which signal/service is not available or is intermittent. This set of criteria are recorded into an accumulated history of signal conditions for the device, or "smart nap records" (76).

Then, if smart napping is enabled (78) such as by a user preference or system feature, the appropriate nap duration is determined (79) from the smart nap records (76) by first determining if the current criteria (e.g. location, time, day, etc.) fall within the ranges of previously experienced signal problem criteria. If so, then a search is made of the smart nap records (76) to determine when and/or where the signal is likely to be reliably available again, and the nap duration is set (701) to last until that time or location.

For example, on Monday, a user takes a new phone equipped with the present invention to work with him as he leaves from his house in the morning. At 8:15 am, he enters a subway station below ground, and signal is lost by the telephone, causing a record of the date, day (Monday), time (8:15 am), and last known location (if so equipped) and a status "lost" to be stored in the nap records. The phone continues to search normally for signal during his subway train ride until he exits the subway system downtown at 8:50 am. At this point, signal is found, so the device records in its nap records a status "found" with the time (8:50 am), day (Monday), date, new location downtown (if so equipped).

The next day on Tuesday, as the phone is taken into the subway, perhaps at 8:18 am, and as signal is lost, a check of the nap records reveals that signal was lost during this same time period with the same last known location (e.g. the location of the entry to the train), so a nap is set to last until 8:50 am. An optional condition is that weekend days (Saturday, Sunday) or other designated days for other culture calendars may be set so that they are analyzed separately from weekdays (Monday through Friday).

Also in FIG. 7, if signal is found (74) on an initial check, the set of conditions (700) for the finding of the signal are recorded (75) in the smart nap records (76), as well.

Figure 8:
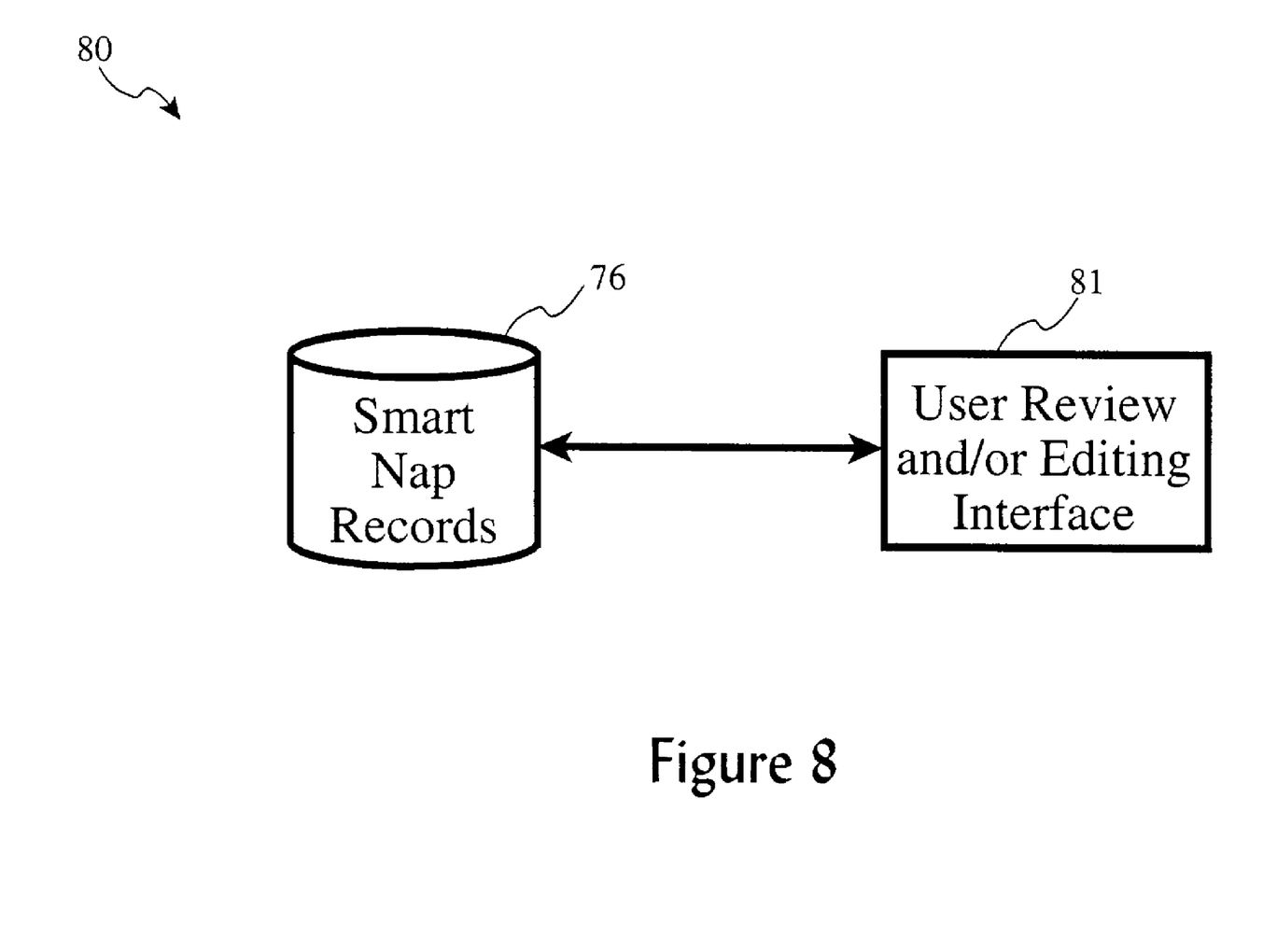
FIG. 8 illustrates an enhanced, optional aspect of the present invention.

Preferably, as shown in the arrangement (80) of FIG. 8, a user interface (81) for reviewing, configuring and editing the smart nap records (76) of the device is provided. This interface may be through the device's own display and user input capabilities, or it may be through an online interface such as a web site which allows the user to upload nap records, visualize them, edit them, and download the modified records. Visualization can be optionally as a text list showing the parameters of each nap record (e.g. time, date, location, tower number, etc.), or graphically as a calendar or map with symbols for where and when signal is lost and found. The latter method allows a user to understand areas of town or days and times when signal is lost, and to specify nap periods by the same criteria (areas on a map for where to nap or blocks of time in a calendar for when to nap).

Optionally, the records may be modified through audible output and input, such as by using text-to-speech technology and/or voice recognition technology. These types of capabilities may be integral to the device, or provided by an audible services server such as a Voice Response Unit (VRU) or Interactive Voice Response (IVR) system.

Figure 9:
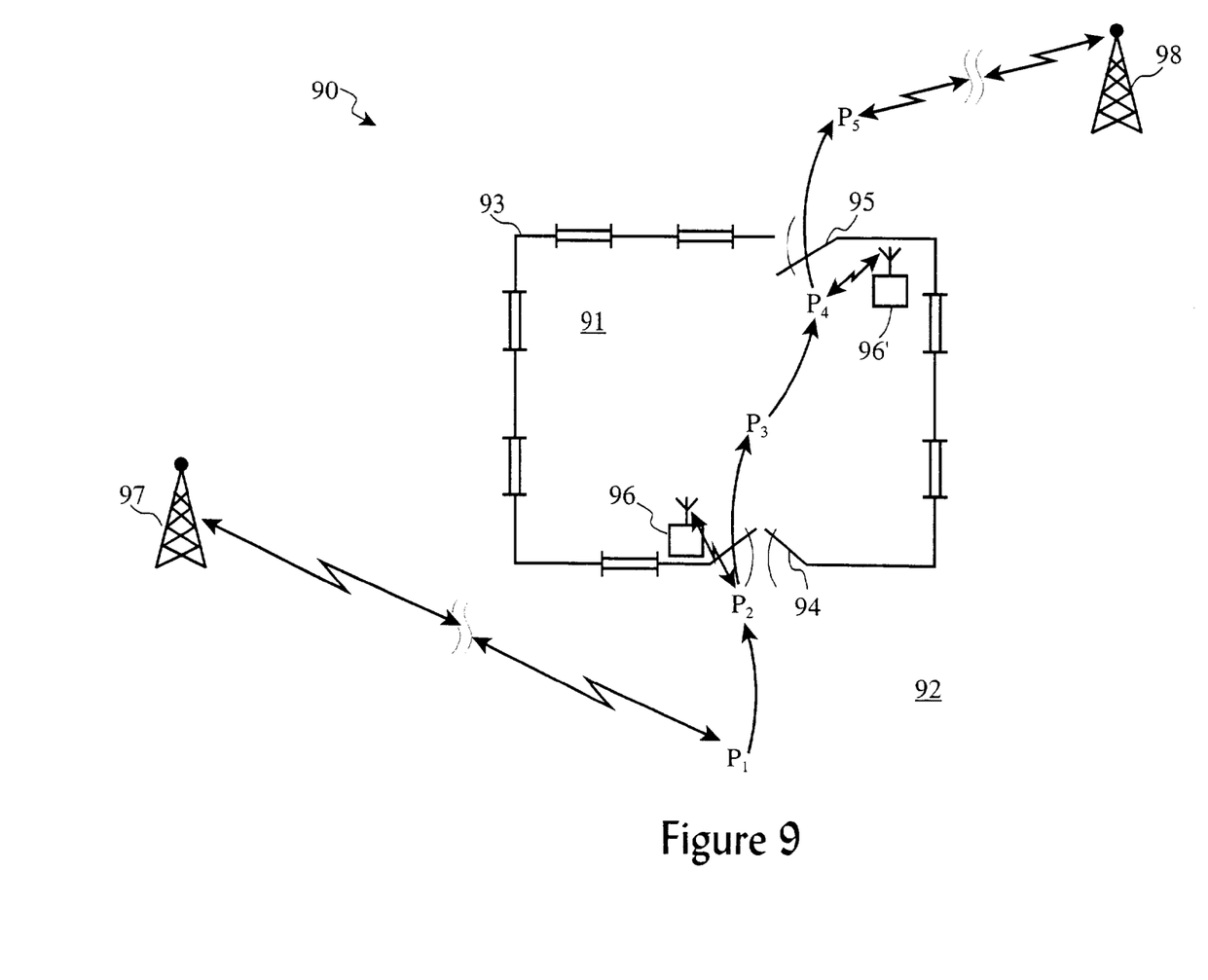
FIG. 9 illustrates another enhanced, optional aspect of the present invention.

Turning to FIG. 9, another optional aspect of the present invention is illustrated. Reception of a low power, local strength RF signal is added to the set of parameters and criteria which are considered in the smart search/smart nap logical process. The control signal may be a common signal, such as the signal used to energize RFID tags for antitheft systems commonly used at retail establishments, or it may be a low power networking signal such as IrDA or BlueTooth.

In the arrangement (90) of FIG. 9, transmitters (96, 96') for the control signal are located nearby entries and exits (94, 95)

to structures (93) which may cause intermittent network signal reception with (91) them, such as stores, malls, office buildings, sub systems, etc. When a device is at a position $P_1$ or $P_5$ away from and outside (92) the interfering structure (93), the control signal is not received and normal operation of searching and finding signals from a tower (97, 98) proceed.

However, as the device is moved near the entry (94) of the structure (93), it comes within the range of the control signal transmitter (96), which causes it to consider the control signal's existence in the smart nap logical process. For example, if the signal was encountered at the same time yesterday, or if multiple records of signal loss for this location and control signal exist in the nap records, it can be assumed that this building regularly causes intermittent reception of signal from the tower (97). As such, a nap can be entered until an expected time of exiting the building or when the control signal is received at the same or another door (94, 95).

Thus, while the device is at a position $P_3$ within (91) the structure (93), battery consumption waste searching for, acquiring and registering with a tower (97) which exhibits intermittent signals in the structure can be avoided. Upon reaching a position $P_4$ near the exit (95) of the building, the control signal is found again and normal searching and registration is enabled for subsequent use outside (92) the structure (93).

Figure 10:
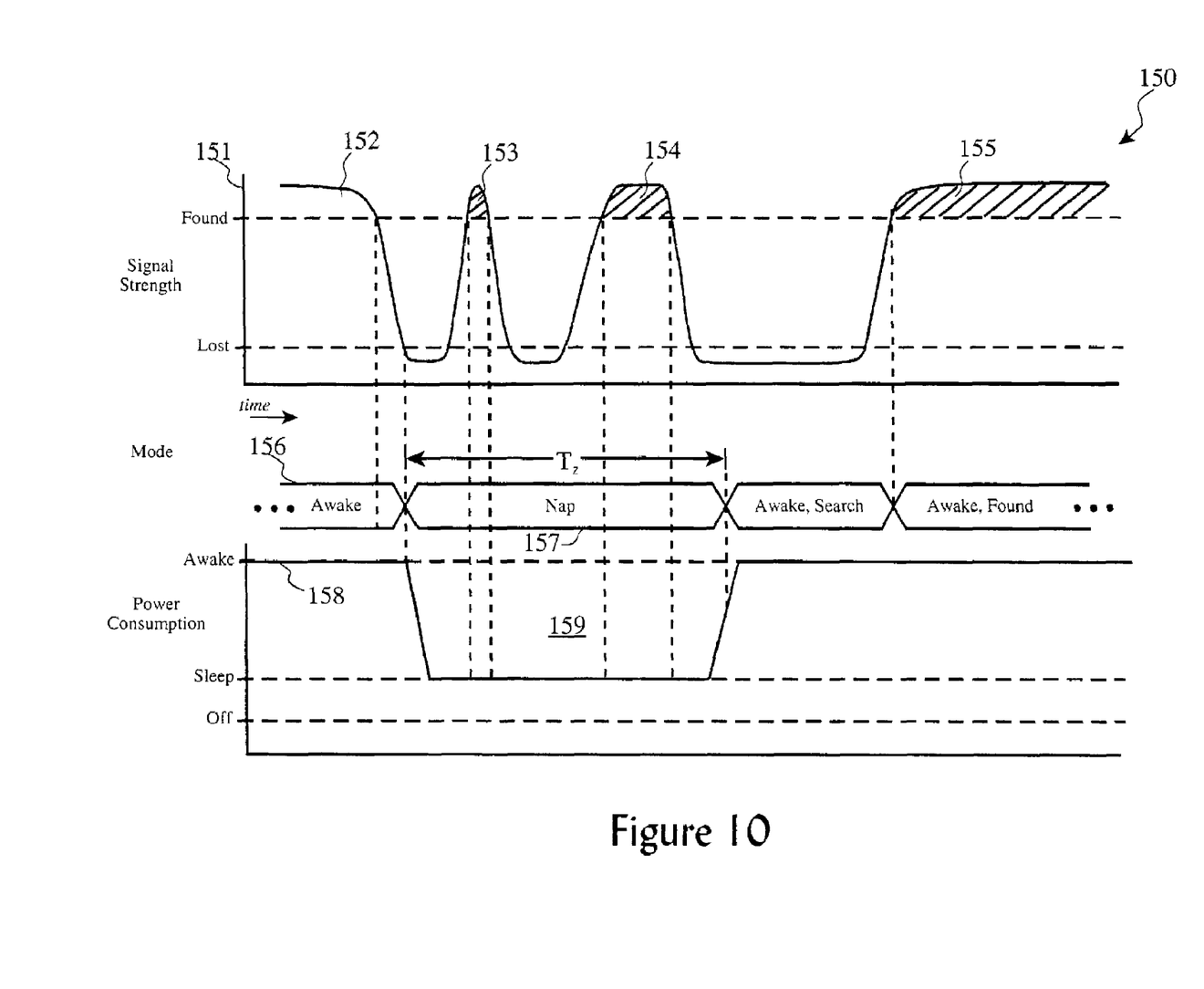
FIG. 10 graphically depicts the battery power consumption profile achieving by employing the present invention.

Referring now to FIG. 10, the enhanced battery consumption profile (150) of a device equipped with the present invention is illustrated. The smart nap (157) of length $T_2$ from the end of an awake state (156) can avoid (159) the wasted power which may otherwise be expended if the device were to wake, search, and register during periods of signal strength (151, 152) transients (153, 154), and can reliably wake the system to search and register during known periods of solid or reliable signal reception (155). As such, power (158) during wake or active periods is minimized to times, days, places, and locations which can be expected to provide continuous service and connection to a tower, base station or access point.

CONCLUSION

The present invention has been disclosed both as a method which may be realized or practiced through combinations of software and hardware implementations, and specific embodiment examples have been provided. It will be recognized by those skilled that the scope of the present invention is not limited to the specific embodiment details provided herein, and that certain variations or alternate embodiments may be employed without departing from the spirit and scope of the present invention, including but not limited to use of alternate hardware platforms, distribution of functionality among different hardware platforms, and use of alternate programming languages, methodologies, signals and protocols. Therefore, the scope of the present invention should be determined by the following claims.

What is claimed is:

1. A method of a battery-powered mobile wireless network device comprising:
    determining by a battery-powered mobile wireless network device that a period of signal intermittence has started by detecting threshold conditions for a transient network signal being intermittently found and intermittently lost;
    recording by said mobile wireless network device events of said threshold conditions with operational criteria associated with operational conditions of the events;
    upon each detection of network signal loss, determining by said mobile wireless network device from said event records a sleep termination condition upon which network signal has been historically reliable following said period of signal intermittence, and determining a sleep duration after which said signal historically becomes reliable and non-intermittent according to said event records;
    avoiding re-registration by said mobile wireless network device into a wireless network by entering a sleep mode by powering down one or more functions or circuits of said mobile wireless network device selected from a group comprising a protocol circuit, an error checking circuit, an error correction circuit, a security circuit, an encryption circuit, a decryption circuit, a radio signal modulation circuit, a radio signal demodulation circuit, a radio frequency frontend, and an antenna; and
    waking by said mobile wireless network device from said sleep mode upon detection of said sleep termination condition, or upon elapse of said sleep duration staffing from said step of determining that a period of signal intermittence has staffed, by enabling said powered down functions or circuits of said mobile wireless network device, thereby resuming attempts to re-register into a wireless network.

2. The method as set forth in claim 1 wherein said step of recording of operational criteria comprises recording criteria selected from the list of time, date, day, month, geographic location, network identifier, and control signal presence.

3. The method as set forth in claim 1 wherein said step of determining a sleep termination condition comprises determining a termination criteria selected from the list of time, date, day, month, geographic location, network identifier, and control signal presence.

4. The method as set forth in claim 1 further comprising the step of providing a local control signal nearby entrances and exits of an interfering physical structure receivable by a mobile device, said control signal being selected from the group of an antitheft tag energizing signal, a lower power radio frequency signal, an Infra Red signal.

5. The method as set forth in claim 1 further comprising the step of providing a user interface for manipulating said event records.

6. The method as set forth in claim 5 wherein said step of providing a user interface for manipulating said event records comprises providing a user interface selected from the group of a web page, a text screen, a map, and a calendar.

7. A system for managing battery energy usage by a mobile wireless network device comprising:
    a threshold detector portion of a battery-powered mobile wireless network device detecting a network signal being intermittently found and intermittently lost, and marking a beginning of a period of signal intermittence;
    an event recorder portion of said battery-powered mobile wireless network device recording events of said signal being intermittently found and intermittently lost with operational criteria associated with operational conditions of the events;
    a sleep condition calculator portion of said battery-powered mobile wireless network device, upon each detection of network signal loss, determining from said event records a sleep termination condition upon which network signal has been historically reliable following said period of signal intermittence, and configured to determine a sleep duration which said signal historically becomes reliable and non-intermittent according to said event records; and a nap mode controller portion of said battery-powered mobile wireless network device:
  avoiding re-registration by said battery-powered mobile wireless network device into a wireless network by entering a sleep mode by powering down one or more functions or circuits of said mobile wireless network device selected from a group comprising a protocol circuit, an error checking circuit, an error correction circuit, a security circuit, an encryption circuit, a decryption circuit, a radio signal modulation circuit, a radio signal demodulation circuit, a radio frequency frontend, and an antenna; and
  waking from said sleep mode upon detection of said sleep termination condition, or upon elapse of said sleep duration starting from said step of determining that a period of signal intermittence has started, by enabling said powered down functions or circuits of said mobile wireless network device, thereby resuming attempts to re-register with into a wireless network;
wherein said portions of said battery-powered mobile wireless network device comprise at least in part hardware or circuitry.

8. The system as set forth in claim 7 wherein said event recorder is further configured to record operational criteria selected from the list of time, date, day, month, geographic location, network identifier, and control signal presence.

9. The system as set forth in claim 7 wherein said sleep condition calculator is further configured to determine a termination criteria selected from the list of time, date, day, month, geographic location, network identifier, and control signal presence.

10. The system as set forth in claim 7 further comprising a local control signal transmitter for installation nearby entrances and exits of an interfering physical structure receivable by a mobile device, said control signal being selected from the group of an antitheft tag energizing signal, a lower power radio frequency signal, an Infra Red signal.

11. The system as set forth in claim 7 further comprising a user interface for manipulating said event records.

12. The system as set forth in claim 11 wherein said a user interface for manipulating said event records comprises a user interface selected from the group of a web page, a text screen, a map, and a calendar.

13. A method of a mobile wireless network device for automatically memorizing patterns of signal loss and difficulty and for avoiding registration comprising:
  memorizing patterns of signal loss, difficulty, and success by:
    responsive to trouble finding a wireless network signal, creating a new signal loss record in a set of smart nap records, said new signal loss record including at least one parameter selected from the group comprising a current time, a current day of the week, a current geographic location, a local tower identifier, a local wireless access point identifier, and a local base station identifier;
    responsive to success finding a wireless network signal, creating a new signal found record in a set of smart nap records, said new signal found record including at least one parameter selected from the group comprising a current time, a current day of the week, a current geographic location, a local tower identifier, a local wireless access point identifier, and a local base station identifier;
  subsequent to said memorizing patterns of signal loss, difficulty, and success, and subsequently responsive to current trouble finding a wireless network signal:
    determining that a memorized pattern in said smart nap records matches one or more current criteria selected from the group comprising a current time, a current day, a current location, a current local tower identifier, a current local wireless access point identifier, and a current local base station identifier;
    responsive to said determining of a match of said memorized patterns and said current criteria:
      searching said smart nap records to select a historical criteria when signal is likely to be reliable, said historic criteria being selected from the group comprising a future time, a future day, a future location, a future local tower identifier, a future local wireless access point identifier, and a future local base station identifier;
    setting a nap termination criteria according to said selected historic criteria; and
    disabling registration of said mobile wireless network device during said nap duration until said nap termination criteria is met.

* * * * *